United States Patent [19]

Kobayashi et al.

[11] Patent Number: 4,750,949

[45] Date of Patent: Jun. 14, 1988

[54] GRAIN-ORIENTED ELECTRICAL STEEL SHEET HAVING STABLE MAGNETIC PROPERTIES RESISTANT TO STRESS-RELIEF ANNEALING, AND METHOD AND APPARATUS FOR PRODUCING THE SAME

[75] Inventors: Hisashi Kobayashi, Kitakyushu; Motoharu Nakamura, Himeji; Kikuji Hirose, Himeji; Toshio Tsukada, Himeji; Hirofumi Yamashita, Himeji, all of Japan

[73] Assignee: Nippon Steel Corporation, Tokyo, Japan

[21] Appl. No.: 796,869

[22] Filed: Nov. 12, 1985

[30] Foreign Application Priority Data

Nov. 10, 1984 [JP] Japan .................................. 59-236973
Oct. 14, 1985 [JP] Japan .................................. 60-226953
Oct. 14, 1985 [JP] Japan .................................. 60-226954

[51] Int. Cl.$^4$ ............................................. H01F 1/04
[52] U.S. Cl. ................................... 148/111; 148/113
[58] Field of Search ............... 148/110, 111, 112, 113

[56] References Cited

U.S. PATENT DOCUMENTS 4,318,758  3/1982  Kuroki et al. ...................... 148/111
4,363,677  12/1982  Ichiyama et al. ................... 148/112

FOREIGN PATENT DOCUMENTS 33878  8/1981  Japan .................................. 148/113

Primary Examiner—John P. Sheehan
Attorney, Agent, or Firm—Kenyon & Kenyon

[57] ABSTRACT

A grain-oriented electrical steel sheet having a low watt loss after stress relief annealing is proposed. The steel sheet, which is final texture annealed, and to which tension is imparted, has a number of recessed parts on the surface thereof forming indentations into the steel sheet body having a depth in the range of from 0.01 to 0.1 mm. The recessed parts are filled with a composition having a coefficient of thermal expansion smaller than that of the steel sheet body. From the recessed parts and the composition the magnetic domains are subdivided.

11 Claims, 10 Drawing Sheets

1mm

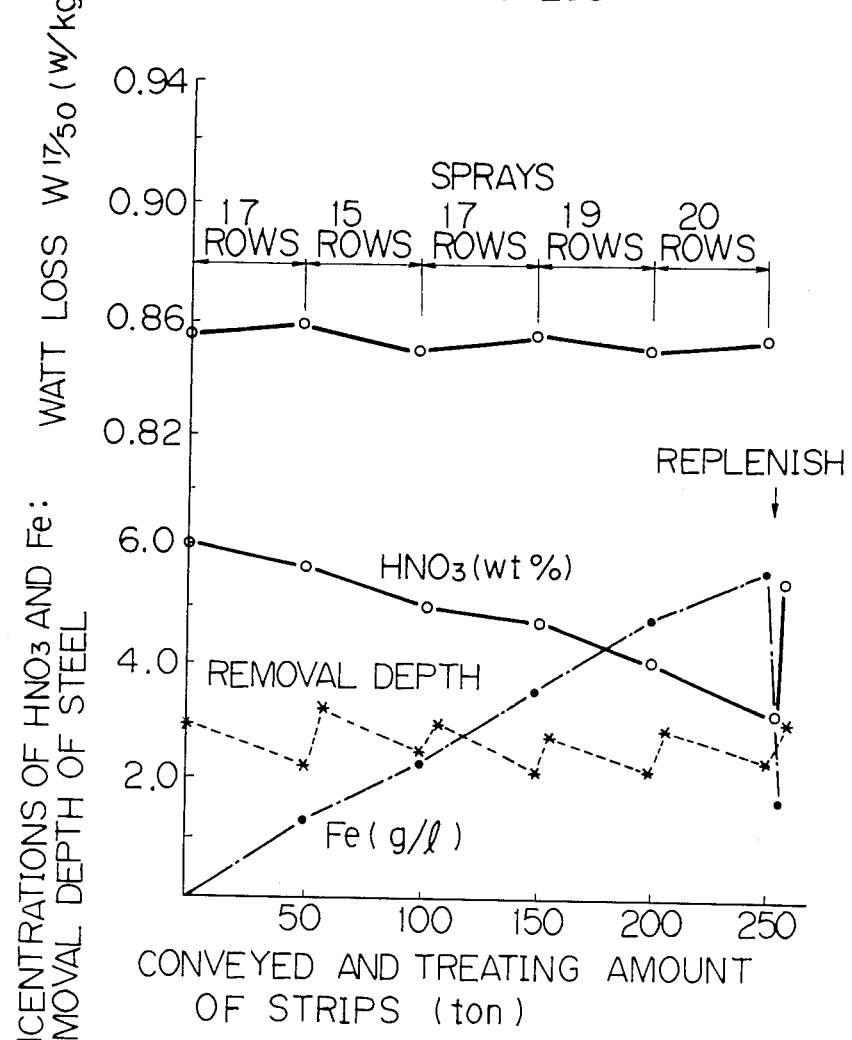

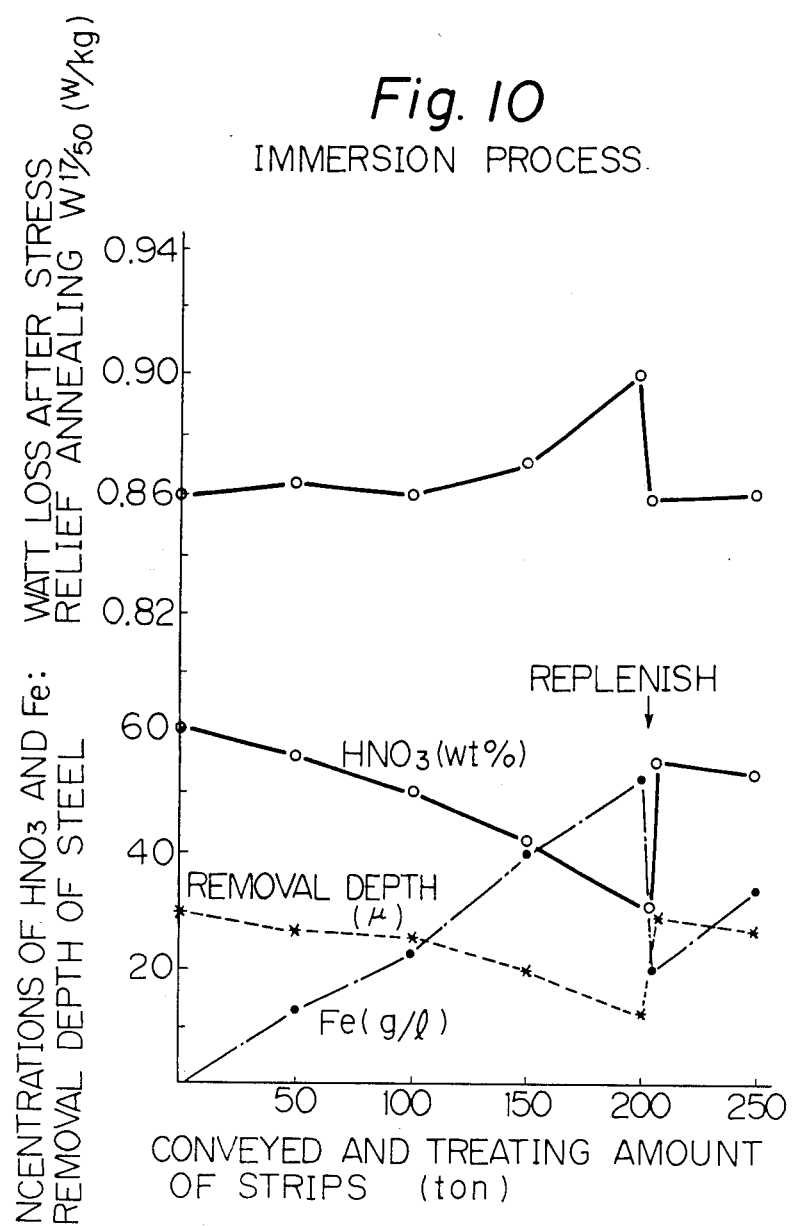

GRAIN-ORIENTED ELECTRICAL STEEL SHEET HAVING STABLE MAGNETIC PROPERTIES RESISTANT TO STRESS-RELIEF ANNEALING, AND METHOD AND APPARATUS FOR PRODUCING THE SAME

BACKGROUND OF THE INVENTION

1. Field of the Invention

The present invention related to a grain-oriented electrical steel sheet, the magnetic properties of which are only slightly deteriorate by stress relief annealing, and to a method and apparatus for producing the same.

2. Description of the Related Arts

It is important in the light of energy saving to lessen the watt loss of grain-oriented electrical steel sheet.

Japanese Examined patent publication No. 58-26405 discloses a watt-loss reduction method, wherein the magnetic domains are subdivided by laser irradiation. The strain induced by the laser irradiation causes a watt loss reduction. The above mentioned method can therefore be applied to the grain-oriented electrical steel sheet for use in the production of laminated cores, which need no stress relief annealing, but cannot be applied to grain-oriented electrical steel sheet for use in the production of wound cores, which need stress relief annealig.

Japanese Unexamined patent publication No. 56-130454 discloses a watt loss reduction method wherein strain is induced to a steel sheet after the secondary recrystallization annealing and the cluster of minute crystal grains, which are formed during the heat treatment after the secondary recyrstallization annealing due to the strain, are utilized for watt loss reduction. Since the cluster of minute crystal grains is formed on the surface of secondary recrystallized steel sheets, the watt loss characteristic is not impaired by the stress relief annealing. It is, however, difficult, by the method of Japanese Unexamined patent publication No. 56-130454, to obtain such a low watt loss as attained by the laser irradiation method.

SUMMARY OF THE INVENTION

The first object of the present invention is to provide a grain-oriented electrical steel sheet, in which a disadvantage of the laser irradiation method, according to which a low watt loss attained is increased by the stress relief annealing and hence the grain-oriented electrical steel sheet can not be stress relief annealed, and a disadvantage of the method for forming the minute crystals, according to which a watt loss attained is not increased by the stress relief annealing but is high, can be overcome.

A second object of the present invention is to provide a method for producing a grain-oriented electrical steel sheet, wherein the watt loss characteristic which is only slightly impaired by the stress relief annealing, and a low watt loss is stably attained.

The third object of the present invention is to provide an apparatus for production of the grain-oriented electrical steel sheet, according to which apparatus the watt loss characteristic is only slightly impaired by the stress relief annealing, and a low watt loss can be stably attained.

The grain-oriented electrical steel sheet herein consists of the steel sheet body, in the most limited sense, the steel sheet body and a layer or coating formed on the steel sheet body during the final texture annealing in a less limited sense, and the steel sheet body, the above layer or coating, and the insulating coating formed thereon in a broad sense.

In accordance with the present invention there is provided a grain oriented electrical steel sheet having a low watt loss after the stress relief annealing, wherein the grain-oriented electrical steel sheet, which is final texture annealed, and to which tension is imparted, has a number of recessed parts on the surface thereof forming indentations into the steel sheet body having a depth in the range of from 0.01 to 0.1 mm, the recessed parts are filled with a composition having a coefficient of thermal expansion smaller than that of the steel sheet body, and the magnetic domains are subdivided from the recessed parts and the composition.

BRIEF DESCRIPTION OF THE DRAWINGS

FIG. 9 illustrates a spraying method according to an example of the present invention; and, FIG. 10 illustrates an immersion method according to a comparative method.

DESCRIPTION OF THE PREFERRED EMBODIMENTS

Figure 1A:
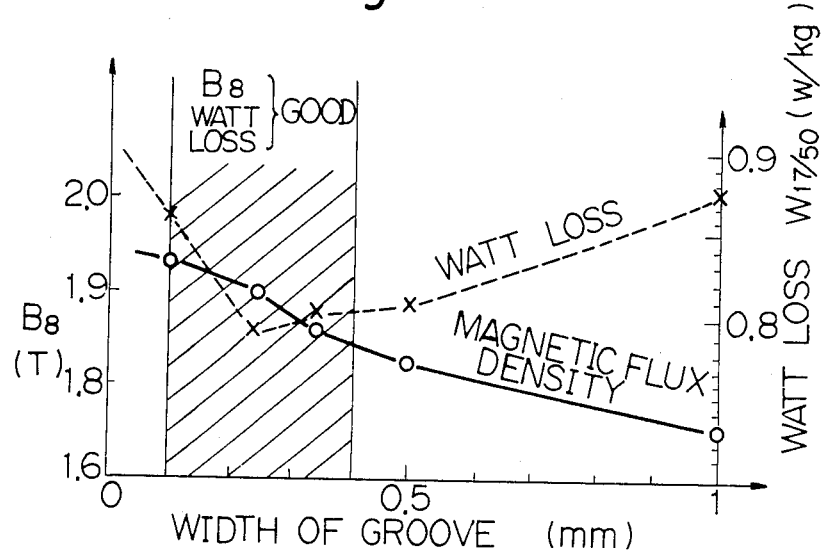
FIGS. 1A and B graphically illustrate the relationships between the magnetic properties and the width and depth of grooves formed on the steel sheet body.

In accordance with the present invention, the grain-oriented electrical steel sheet which has been final texture annealed or may further be subjected to formation of the insulating coating, is subjected to partial removal of steel of the steel sheet body and a phosphate coating for imparting tensile stress to a steel sheet (usually referred to as the tension coating) is formed on the grain-oriented electrical steel sheet. The recessed parts formed by the partial removal of steel are therefore filled with the compound which exhibits, after a baking heat-treatment of the tension coating, a coefficient of thermal expansion smaller than that of the steel sheet body. The filling of the recessed parts by such compound improves the magnetic properties and prevents deterioration of the magnetic properties from occurring during stress relief annealing.

The present invention is now explained in detail with regard to the process beginning at the hot-rolling. The silicon-steel slab containing 4% or less of Si is heated and then hot-rolled to obtain a steel strip having an intermediate thickness. The hot-rolled steel strip is pickled and is heat-treated, if necessary. The hot-rolled strip is cold-rolled by one stage-or two stage-cold rolling with an intermediate annealing to obtain the cold-rolled strip having the final sheet thickness. The strip is then decarburization annealed. The annealing separator is then applied on the decarburization annealed steel strip, which is then final texture annealed. The above is an ordinary process for producing a grain-oriented electrical steel sheet. The grain-oriented electrical steel sheet may be further coated with the tension coating.

The grain-oriented electrical steel sheet, the steel of which is partly removed, is that with or without the tension coating. The removal methods of the steel are as follows. Mechanical method, such as imparting the mechanical stress to the surface of the grain-oriented electrical steel may be used. Marking off and groove formation by a grooved roll can be used as the mechanical removal method. In addition, laser, electron beam or infrared ray irradiation may be used. The insulating coating of the grain-oriented electrical steel sheet is selectively removed or peeled by the mechanical or irradiation method and then the selectively exposed steel sheet body is dissolved and removed by acid, such as chloric acid, or nitric acid. The dissolution procedure may be any of, for example, immersion, spraying, electrolytic pickling, or the like. As a result, the recessed parts indented into the steel sheet body in the form of a groove are formed. If such recessed parts can be formed only by marking off, this method can be used.

The grooves extend preferably perpendicular to the rolling direction (<001> orientation) but may be slanted by an angle of, for example, 45° to the rolling direction. If the slant angle is extremely great, the grooves become undesirable in the light of watt loss reduction. The laser irradiation mentioned above causes the watt loss reduction and the strain induction as in Japanese Unexamined patent publication No. 58-26405. The laser irradiation mentioned above is, however, different from this publication in the point that the local strain remaining after the stress relief annealing is advantageously utilized for the watt loss reduction. The distance between the grooves as seen in the rolling direction is preferably from 2.5 to 10 mm, since the watt loss reduction is greatest at this distance. This distance is the same as that disclosed in Japanese Unexamined patent publication No. 58-26406.

Each groove may be formed by either a line or spots. In the case of spots, the distance between the spots is preferably 0.7 mm or less, more preferably 0.3 mm or less. When the distance between the spots is greater than 0.7 mm, the watt loss reduction becomes small.

The present invention is further explained with reference to the drawings.

FIG. 1A shows the dependence of the magnetic flux density ($B_8$) and watt loss $W_{17/50}$ upon the width of a groove. In the tests, the results of which are shown in FIG. 1A, 0.23 mm thick grain-oriented electrical steel sheets having a phosphate coating or a coating comprised of semi-organic coating were used, and grooves 0.05 mm in depth, spaced from one another by a distance of 5 mm were formed while varying the groove width. The tension coating was used as the composition having a coefficient of thermal expansion different than that of the steel sheet body. After application the tension coating it was baked at 850° C. for 5 minutes.

The phosphate coating herein is liquid consisting of colloidal silica, phosphate, such as aluminum phosphate, and chromic acid anhydride or chromate. The colloidal silica and phosphate are the major components in the coating, and when these components are baked, the composition resulting therefrom has a coefficient of thermal expansion different from that of steel sheet body and imparts a tensional stress to that body. Note, however, in implementing the present invention, any coating composition having the same function as phosphate coating can be used. It may contain further magnesium phosphate.

Now again referring to FIG. 1A, one of the magnetic properties, i.e., the magnetic flux density $B_8$, lessens in accordance with an increase in the groove width, and the other magnetic property, i.e., the watt loss $W_{17/50}$, is high at an extremely narrow width of a groove. The high watt loss $W_{17/50}$ results from a small generation quantity of strain due to extremely narrow width of a groove. It is therefore preferred that the groove width be 0.1 mm or more. The grooves in the light of the magnetic properties are preferably approximately 0.4 mm or less.

Figure 1B:
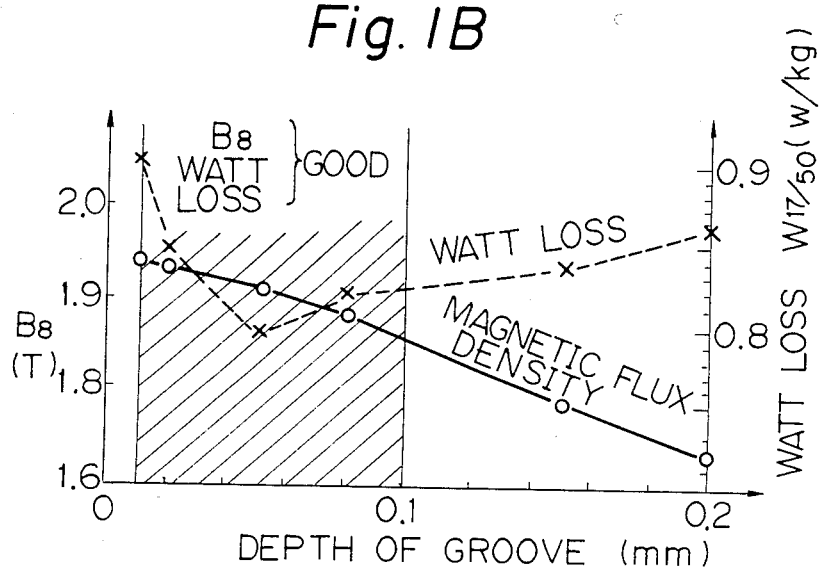

FIG. 1B shows the results of tests similar to those in the case of FIG. 1A. In these tests, the 0.3 mm wide grooves were formed on 0.23 mm thick grain-oriented electrical steel sheets, at a distance of 5 mm, while varying the depth of the grooves. The above mentioned coating solution was applied on the grain-oriented electrical steel sheets and baked at 850° C. for 5 minutes, to form a film of the coating composition in the grooves. An improvement in the magnetic properties over those of the prior art was attained at the groove depth in the range of from 0.01 to 0.1 mm. At a depth greater than 0.1 mm, the watt loss $W_{17/50}$ is not impaired but the magnetic flux density $B_8$ is greatly lessened. At a groove depth of 0.01 mm, the watt loss $W_{17/50}$ is approximately 0.9 W/kg and is lower than that of the conventional products. The improvement in the watt loss $W_{17/50}$ is outstanding when the groove depth is 0.02 mm or more. Accordingly, a preferred groove depth is from 0.02 to 0.08 mm.

As is described with reference to FIGS. 1A and B, steel is partly removed from a surface of the steel sheet body and subsequently the so formed recessed parts are filled with the compound in accordance with the present invention. The coefficient of thermal expansion of such a compound is smaller than that (approximately $13 \times 10^{-6}$) of the steel sheet body and can impart tensional stress to the steel sheet. In order to fill the recessed parts with the compound, the coating liquid, such as a phosphate coating, is applied on the grain-oriented electrical steel sheet. From an industrial point of view, the application of a coating liquid over the entire grain-oriented electrical steel sheet is preferred to partial application. In the tests explained with reference to FIGS. 1A and B, the entire application was conducted, but the local application of coating liquid is also effective for attaining the advantages of the present invention. Regarding the filling method of the compound, any method may be used, provided that the compound is filled in the previously recessed parts of the steel sheet body. In order to enhance the bonding force between the filled composition and steel of steel sheet body, a bonding-reinforcing material, such as Ni plating or vaporization deposition of silica is advantageously used. This further enhances the improvement in the magnetic properties. The Ni plating layer preferably has a thickness of 1 $\mu$m or less, when the coating liquid contains colloidal silica.

Figure 2:
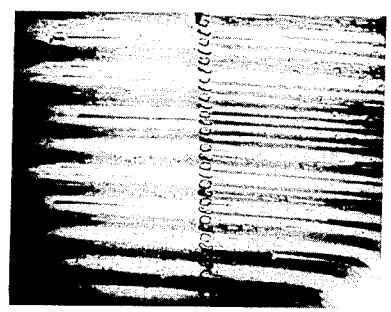
FIG. 2 shows the scanning type electron microscope photographs of the grain-oriented electrical steel sheet, in which the magnetic domains are subdivided.

Referring to FIG. 2 shows the result of observation of the magnetic domains by means of a scanning type electron microscope. The sample subjected to the observation was prepared as follows. A grain-oriented electrical steel sheet having a tension coating was irradiated with laser and was then corroded in a nitric solution to form holes approximately 0.025 mm in depth. The coating liquid consisting of alumina phosphate, colloidal silica, and chromic acid was baked at 350° C. Heat treatment was then carried out in air at 850° C. for 2 minutes. Stress relief annealing was then carried out at 850° C. for 4 hours.

As is evident, the magnetic domains generate at the parts where the holes were formed. It is believed that the parts of the steel sheet body where the steel is removed provide the generation sites of the subdivided magnetic domains, which pass the rolling direction and which lessen the watt loss.

In the foregoing descriptions, the grain-oriented steel sheets in the less limited and the broad senses were described, since the most economical products can be obtained by using the same. Nevertheless, the grain-oriented electrical steel sheet in the narrowest sense also can be subjected to the method described hereinabove. That is, final texture annealing is carried out and then secondarily recrystallized steel sheet having neither surface layer nor a film can be subjected to the method of the present invention.

The magnetostriction of the grain-oriented electrical steel sheet according to the present invention was measured and found to be equivalent to that of the conventional products.

Referring to FIGS. 3A-G, various surface-layer structures of the secondarily recrystallized steel sheet according to the present invention are shown by a partial cross sectional view.

Figure 3A:
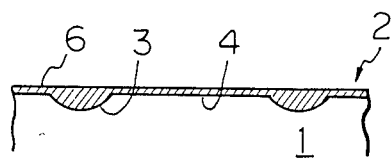
FIG. 3A through G show schematically the structures of the grain-oriented electrical steel sheet according to the present invention.

In FIG. 3A, neither coating nor layer are formed on the secondarily recrystallized steel sheet 1. The recessed parts 3 are formed on the surface 2 of the secondarily recrystallized steel sheet 1.

The composition for imparting tensional stress 6 to the steel sheet is entirely applied on the surface 2 of the steel sheet. The composition 6 is placed on the major surface 4 of the steel sheet and is filled in the recessed parts 3. Metal plating may be sandwiched between the surface 2 of the steel sheet and the above-mentioned composition 6 to enhance the bonding strength therebetween.

Figure 3B:
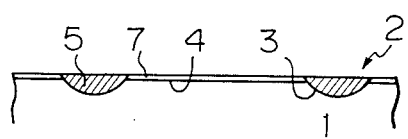

In FIG. 3B, the grain-oriented electrical steel sheet includes the secondary recrystallization film 7 usually referred to as the forsterite layer or film. The recessed parts 3 are filled with the composition as indicated by reference numeral 5. The composition 5 is partly applied on the surface 2 of the steel sheet and is filled in the recessed parts 3.

Figure 3C:
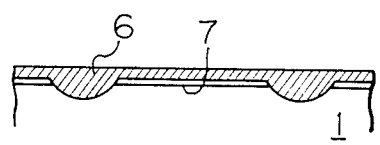

Referring to FIG. 3C the composition having the same components and contents as that of composition 5 is applied entirely on the surface 2 of the steel sheet (as indicated by "6") and is filled in the recessed parts of the grain-oriented electrical steel sheet having the forsterite film such as shown in FIG. 3B. The grain-oriented electrical steel sheets explained with reference to FIG. 3B and C can be used, as having the structure as shown in the drawings, for producing the second core of transformers.

The composition for imparting the tensional force 6, which composition is partly applied and is filled in the recessed parts, can undergo any thermal process, e.g., baking or stress relief annealing. After the thermal process, local stress is generated in the recessed parts due to a shrinkage fitting effect of the composition 6 and steel at the recessed parts 3. And, also the recessed parts 3 have the poles therearound due to a magnetic shape effect. The intensity of magnetic poles is influenced by the groove depth and width. Due to the formation of magnetic poles, the 90° domains generate around the recessed parts 3.

Figure 3D:
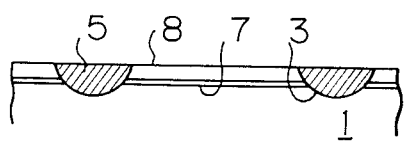
Figure 3E:
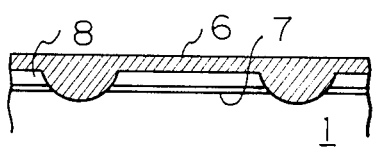

In FIG. 3E, the semi-organic film 8 is applied on the entire top surface of the grain-oriented electrical steel sheet.

Figure 3F:
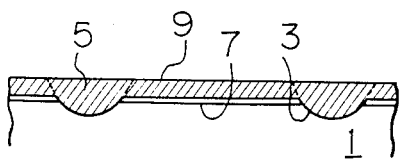

In FIG. 3F, the recessed parts 3 are formed on the grain-oriented electrical steel sheet having the forsterite film 7 and the tension coating 9, and the composition for imparting the tensional stress 5 is filled within the recessed parts 3.

Figure 3G:
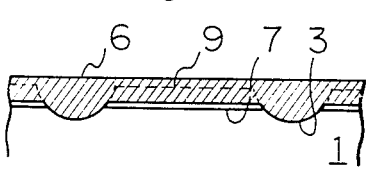

In FIG. 3G, the composition 5 mentioned above is applied on the entire top surface of the grain-oriented electrical steel sheet explained with reference to FIG. 3F.

In the case of partial application of the above mentioned composition, the composition is filled within the recessed parts and may be applied in the vicinity of the recessed parts. The grain-oriented electrical steel sheet according to the present invention can have a structure wherein the above mentioned composition is filled in and located in the vicinity of the recessed parts.

In FIG. 3D, a semi-organic film 8 which does not impart tension to the steel sheet is applied on the forsterite film 7. The composition for imparting the tensional stress 5 is filled within the recessed parts 3 of the steel sheet 1.

The subdivided, 180° magnetic domains are formed due to the forsterite film or tension coating, which applies a tensional stress to the 90° magnetic domains. When the above mentioned composition is applied on the entire surface of a steel sheet, the subdivision of the magnetic domains is promoted as compared with the partial application, due to the tensional stress generated on the major surface by the above mentioned composition.

EXAMPLE 1

A 0.23 mm thick grain-oriented electrical steel sheet was prepared by a one stage cold-rolling method. The grain-oriented electrical steel sheet which had undergone the final texture annealing, was subjected to marking-off by means of a knife. The linear grooves were formed, by the tip end of a knife, in a direction perpendicular to the rolling direction, and with a distance of 5 mm therebetween. The grooves had a width of 0.2 mm and protruded into the underlying metal to a depth of approximately 0.03 mm. Subsequently, a coating solution was applied on the steel sheet. The coating solution consisted of 100 cc of 20% colloidal silica-aqueous dispersion liquid, 60 cc of 50% aluminum phosphate aqueous solution, and 6 g of chromic acid anhydride. The coating solution was baked at 830° C. for 3 minutes. After baking the coating solution, the steel sheet was stress-relief annealed at 850° C. for 4 hours. The watt loss of the steel sheet was measured prior to and subsequent to the stress relief annealing, in the rolling direction.

For comparison purposes, the above mentioned grain-oriented steel sheet was subjected to the same procedure as explained above, except that the marking off was not carried out. In addition, the grain-off oriented electrical steel sheet was subjected to the same procedure as explained above, except that the marking off was carried out (not after the final texture annealing) after the baking of coating solution. The distance between the grooves, and the depth and width of the grooves were the same as explained above. However, the grooves are formed on the phosphate coating. The watt loss measured is given in Table 1.

TABLE 1

| | Process | | $W_{17/50}$ (W/kg) |
|---|---|---|---|
| Conventional | Final texture annealing, imparting a phosphate coating, and then stress relief annealing | | 0.93 |
| | After imparting the phosphate coating in the above process, marking off and then stress relief annealing | | 0.85 |
| Invention | Final texture annealing, then marking off, and application of a | Before stress relief annealing | 0.80 |
| | tension-imparting coating, baking at 830° C. for 3 minutes | After stress relief annealing | 0.82 |

As is apparent from Table 1, the watt loss $W_{17/50}$ is lessened only by means of marking off. This is because the marking off generates minute grains in the secondary recrystallized grains. The steel sheet treated according to the present invention exhibits a $W_{17/50}$ which is lower, by 0.11 to 0.13 W/kg, than the $W_{17/50}$ attained by the final texture annealing and then tension-imparting by the phosphate coating. The steel sheet treated according to the present invention exhibits a $W_{17/50}$ which is lower, by 0.03 to 0.05 W/kg than the $W_{17/50}$ attained by marking off and stress relief annealing. It is therefore evident that when the material of phosphate coating, which has a low coefficient of thermal expansion and which imparts tension upon the film-formation, is filled in the grooves, such filling is effective for improving the watt loss characteristics.

EXAMPLE 2

A 0.23 mm thick grain-oriented electrical steel sheet was produced by a one stage cold-rolling process. A phosphate coating was applied on the surface of the grain oriented electrical steel sheet on a forsterite film. Subsequently, the coated surface was subjected to exfoliation by irradiation of a YAG laser, which was pulsed at an intensity of about 4 mJ, thereby forming spot-like holes 0.2 mm in diameter on the coated surface, aligned at intervals of 0.3 mm in the direction perpendicular to the rolling direction. The holes were arranged in the form of spot-lines, each being spaced at 5 mm. The steel sheet was then immersed in 61% nitric acid at 25° C. for 90 sec to give a hole depth about 0.04 mm.

Then the steel sheet was Ni-plated in a Watts bath containing 240 g/l of nickel sulphate, 45 g/l of nickel chloride and 30 g/l of boric acid, at 60° C. for 5 sec, with a current density of 5 A/dm$^2$.

A coating liquid, composed of 100 cc of 20% colloidal silica-aqueous dispersion liquid, 60 cc of 50% aluminum phosphate aqueous solution, 15 cc of 25% magnesium chromate aqueous solution and 3 g of boric acid, was applied on the Ni-plated steel sheet, followed by baking at 850° C. for 3 mins. Then the steel sheet was stress relief annealed at 800° C. for 4 hrs.

Another steel sheet was prepared in the same way as above, but the Ni-plating was not applied.

The watt loss values in the rolling direction are shown for both steels in Table 2.

TABLE 2

| Art | Process | | $W_{17/50}$ (W/kg) |
|---|---|---|---|
| Conventional | Final texture annealed, phosphate coating imparted and stress-relief annealed | | 0.92 |
| Invention | Without Ni—plating | Before SRA* | 0.79 |
| | | After SRA | 0.82 |
| | Ni—plated | Before SRA | 0.78 |
| | | After SRA | 0.80 |

*SRA: stress-relief annealing

As can clearly be seen in the Table 2, the steel sheets according to the present invention have greatly improved watt loss values compared to that of a conventional steel sheet.

Ni plating resulted in a slight difference in the deterioration of the watt loss due to the stress relief annealing. The watt loss values of the products with and without Ni plating were far superior to that of the conventional product.

EXAMPLE 3

A 0.175 mm thick grain-oriented electrical steel sheet was produced by a two stage cold-rolling process. A phosphate coating film was applied on the forsterite film of the above mentioned steel sheet. Subsequently, the coated surface was subjected to exfoliation by irradiation of a YAG laser, which was pulsed at an intensity of about 4 mJ, and thereby forming spot-like holes 0.3 mm in diameter on the coated surface. The holes were arranged in the form of spot lines in the direction perpendicular to the rolling direction. Each holes are spaced at 0.4 mm, and the lines of the holes were spaced at 6 mm.

The steel sheet was then immersed in 61% nitric acid at 40° C. for 60 seconds to form holes about 0.025 mm in depth.

A coating liquid, composed of 100 cc of 25% colloidal silica-aqueous dispersion liquid, 60 cc of 50% aluminum phosphate aqueous solution and 6 g of chromic acid anhydride was applied on both surfaces (2 g/m$^2$) of the immersion treated steel sheet, followed by baking at 450° C. for 5 minutes. Then, the steel sheet was stress-relief annealed at 850° C. for 4 hours.

The watt loss values in the rolling direction of the thus prepared steel sheet are shown in Table 3.

The steel sheet according to the present invention shows greatly improved watt loss values compared to those of the conventional sheet.

TABLE 3

| Art | Process | $W_{13/50}$ (W/kg) | $W_{17/50}$ (W/kg) |
|---|---|---|---|
| Conventional | Final texture annealed, phosphate coating imparted and then stress-relief annealed. | 0.43 | 0.83 |
| Invention | — | 0.39 | 0.76 |

EXAMPLE 4

A 0.23 mm thick grain-oriented electrical steel sheet was produced by a one stage cold-rolling process. A phosphate coating was applied on the forsterite film of the above mentioned steel sheet. Subsequently, the coated surface was subjected to exfoliation by irradiation of a $CO_2$ laser (1.50 KW of power, 0.2 mm beam diameter, and 12 m/sec scanning speed), thereby exfoliating linearly in the direction perpendicular to the rolling direction. The lines were spaced at 5 mm.

The steel was then immersed in 61% nitric acid at 40° C. for 70 seconds to form grooves about 0.03 mm in depth.

A coating liquid, 100 cc of which contained colloidal silica ($SiO_2$ content, 14 g), 25 g of magnesium phosphate and 4 g of chromic acid anhydride, was applied by means of a rubber toothed wheel at 5 mm pitch to fill the underlying-iron removed part of the steel surface, followed by baking at 450° C. for 5 minutes. Then, the steel sheet was stress-relief annealed at 850° C. for 2 hours.

The watt loss value in the rolling direction of the thus prepared steel sheet is shown in Table 4.

The steel sheet according to the present invention shows a greatly improved watt loss value compared to that of conventional steel sheet.

It is evident from this result that the local filling of a tension imparting substance of phosphate coating is effective in decreasing in watt loss.

TABLE 4

| Art | Process | $W_{17/50}$ (W/kg) |
| --- | --- | --- |
| Conventional | Final texture annealed, phosphate coating imparted and then stress-relief annealed | 0.92 |
| Invention | — | 0.83 |

EXAMPLE 5

A 0.23 mm thick, glass-free grain-oriented electrical steel sheet was produced by a one stage cold-rolling process. This steel sheet was mirror finished in a solution containing 100 volume part of hydrogen peroxide (30% aqueous solution) and 5 volume part of fluoric acid. Both surfaces of the steel sheet were mirror finished. The samples were taken from this sheet and an acid-resistant tape was adhered entirely to one of the surfaces of samples. Acid-resistant tapes were adhered on the other surface so that the mirror finished steel was exposed at distances of 5 mm and widths of 0.3 mm. The samples were then immersed in the 61% nitric acid solution (40° C.) for 60 seconds to form grooves approximately 0.025 mm in depth. After formation of the grooves, all of the tapes were peeled off. The samples were then subjected to Ni plating in a Watts bath at a current density of 5 A/dm² for 5 seconds, and subsequently to application of a coating solution on both surfaces thereof. The coating solution consisted of 100 cc of 20% colloidal silica dispersion-aqueous solution, 60 cc of 50% aluminum phosphate-aqueous solution, 15 cc of 25% magnesium chromate-aqueous solution, and 3 g of boric acid. The application amount was 3 g/m². The coating solution was baked at 850° C. for 3 minutes. The samples were the stress relief annealed at 800° C. for 4 hours.

For comparison purposes, the same procedure as explained above was carried out except that the grooves were not formed and the baking was carried out at 850° C. for 4 hours.

The results of the test are given in Table 5.

TABLE 5

| | Process | $W_{17/50}$ (W/kg) |
| --- | --- | --- |
| Conventional | Final texture annealing, mirror finishing of both surfaces, Ni—plating, phosphate coating and stress relief annealing | 0.76 |
| Invention | Final texture annealing, mirror finishing of both surfaces, local removal of steel sheet body Ni—plating, phosphate coating and stress relief annealing | 0.71 |

As is apparent from Table 5, the $W_{17/50}$ according to the present invention is less than the conventional $W_{17/50}$ by 0.05 W/kg.

The method for treating the grain-oriented electrical steel sheet provided in accordance with the third object of the present invention comprises irradiating the surface of the grain-oriented electrical steel sheet having an insulating film thereon with a laser beam, thereby forming a number of removed parts of the insulating film, and then removing the steel of the steel sheet body exposed through the above-mentioned recessed parts, by etching. According to a feature of the present invention, etching is performed by spraying a nitric acid solution so as to obtain a removal depth of steel of the steel sheet body, which depth is uniform over the recessed parts of steel sheet body. The nitric acid solution for etching the steel of the steel sheet body is advantageous over the sulfuric acid solution and hydrochloric acid solution, since the dissolution quantity of insulating film by the former solution, is considerably smaller than that of the latter solution. Below a concentration of nitric acid of 20% by weight, the etching rate is low, while at a concentration of more than 70% weight, a problem of smoke generation arises.

Figure 4:
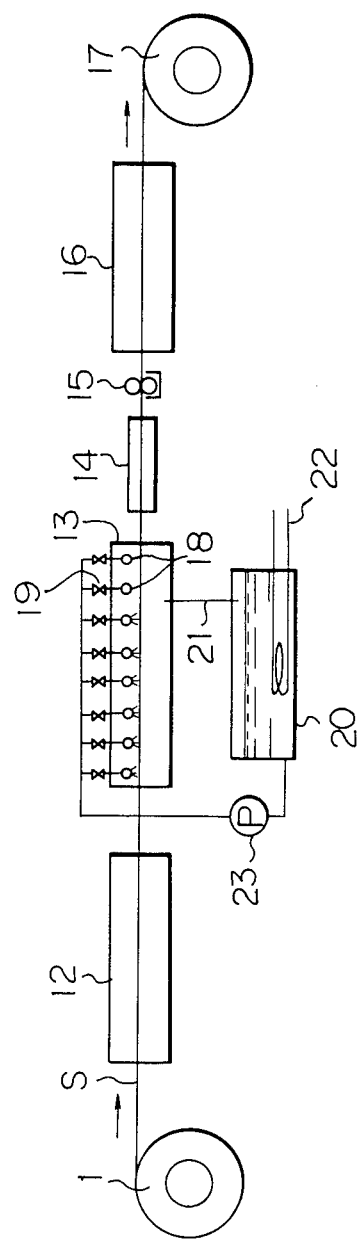
FIG. 4 illustrates a process for forming and filling the recessed parts according to the present invention.

Referring to FIG. 4, an apparatus for performing the method described above is illustrated. The apparatus comprises an uncoiling device 10, a laser beam-irradition device 12, an etching device 13 for spraying the acid liquid, a rinsing (water-cleaning) and drying device 14, a device for recoating the insulating film 15, a baking device (furnace) 16, and a coiling device 17. The grain-oriented electrical steel strip S is treated during uncoiling and coiling thereof by means of the apparatuses and the like 12, 13, 14, 15, and 16. The laser beam-irradiation device 12 forms marks on the grain-oriented electrical steel strip S. These marks are most preferably formed perpendicular to the rolling direction. The marks may be linear or spot-like as explained hereinabove, and may be formed one or both surfaces of the grain-oriented electrical steel sheets. In FIG. 4, the marks are formed on one surface, i.e., the upper surface of the grain-oriented electrical steel sheets. These steel sheets were treated by an etching device 13 to dissolve and remove the steel under the laser marks. The etching liquid used for dissolution and removal of the steel preferably does not dissolve the electrical insulating film and is most preferably a nitric acid solution. The etching device 13 is equipped with a number of spray nozzles 18 positioned above the steel strip S. The nitric acid solution is sprayed through the spray nozzles for etching of the steel strip S and is once transferred into the circulation tank 20 via the connection circuit 21. The etching solution is then fed and circulated by the action of a pump 23 to each of the spray nozzles 18. The conduits at the entrance side of the spray nozzles 18 are equipped with valves 19. The heater 22 maintains the liquid temperature within a predetermined range of, for example, from 30° to 70° C.

The dispersion in the watt loss values is lessened by spraying the nitric acid solution on to the grain-oriented electrical steel strip S having a number of removed parts of the insulating film due to the laser beam irradiation in the device 12, as compared with the case of dipping the above mentioned strip S in the case of dip-pickling. As a result the watt loss characteristics are stable in the case of spraying the nitric acid solution. The reasons for reduction in the dispersion of the watt loss values and stabilization of the watt loss characteristics are considered to be as follows.

Bubbles are formed by the acid during etching but are washed out by the spraying. The bubbles therefore do not impede a uniform and direct contact of the nitric acid solution with steel exposed through the removed parts of the insulating film. As a result, the depth of recesses or indentations becomes uniform over the entire recesses or indentations, and hence the watt loss characteristics become uniform.

Figure 5:
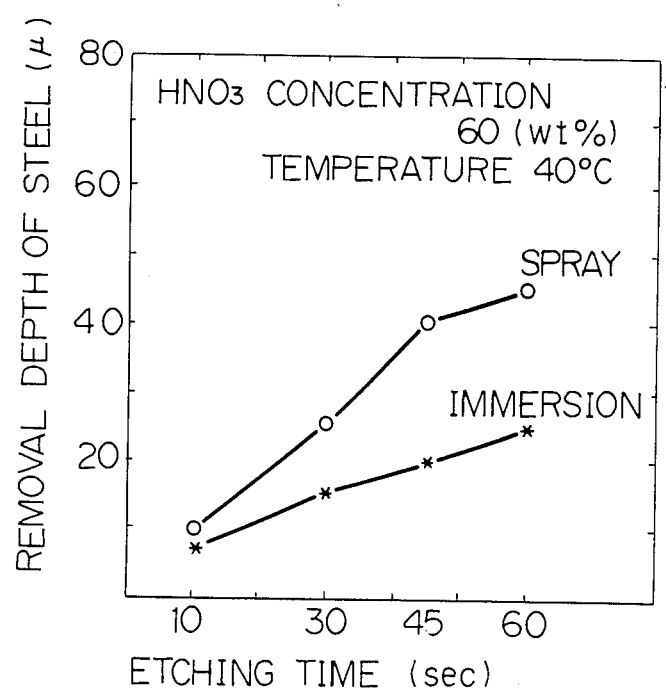
FIG. 5 graphically illustrates the relationship between the etching time and the removal depth of the steel.

In addition, the etching efficiency is higher in the spraying method than in the dipping method. The reason for this is because the fresh acid solution is uninterruptedly and continuously fed over the steel strip and hence the etching time is shortened (c.f. FIG. 5).

Figure 6:
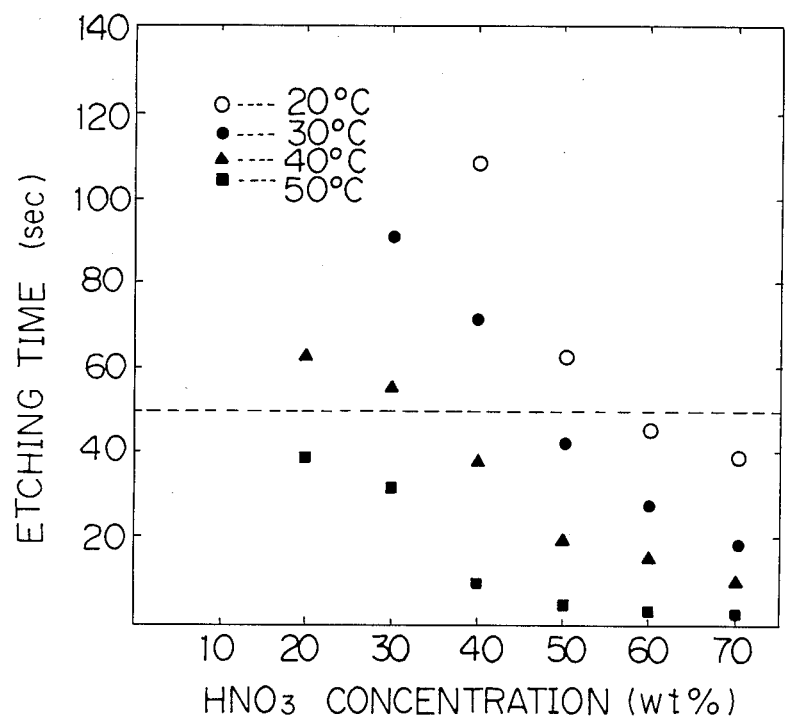
FIG. 6 shows the relationships between the $HNO_3$ concentration and etching time.

Referring to FIG. 6, the relationship between the concentration of nitric acid and the etching time, for obtaining an optimum etching depth of from approximately 0.02 to 0.08 mm, is shown. The horizontal dot line indicates the etching time of 50 seconds, which is the longest etching time industrially employable. In order to obtain such an etching time, the concentration of nitric acid must be 20% by weight or more. The highest concentration of nitric acid is limited, not from the viewpoint of the etching time but from the point of smoke generation which impairs the working environments. The highest concentration of nitric acid is 70% by weight. A preferred concentration of nitric acid is from 30 to 60% by weight.

EXAMPLE 6

A 10 ton coil 0.23 mm thick, high magnetic flux density, grain-oriented electrical steel strip coated with a tension insulation film (5 g/m$^2$) was separated into binary parts along the longitudinal direction. One of the separated parts of the coil was processed through the line shown in FIG. 4 to form underlying-metal exposed sites, i.e., coating-film removed sites, on the surface of the strip by means of irradiation by a YAG laser. The strips then underwent etching of the underlying-metal exposed sites in an etching apparatus having multiple rows of nitric acid sprays. The strips were subsequently rinsed by water, dried, and finally subjected to a tension insulation coating treatment (2 g/m$^2$) in order to repair the underlying-metal exposed sites.

The laser irradiation and etching conditions were as follows:
(1) Laser irradiation:
   (a) Irradiated surface: one surface
   (b) Energy density: 2 mJ/mm$^2$
   (c) Irradiation marks:
      Diameter of spots (holes): 0.2 ~0.3 mm
      Distance between the centers of spots in C direction (direction along width): 0.5 mm
      Distance between the rows of spots in L direction (longitudinal direction): 5 mm
(2) Etching:
   (a) Mode: spraying
   (b) Medium: 60 wt % nitric acid held at 40° C.
   (c) Number of rows of sprays: 20
   (d) Duration of spraying: 30 sec
   (e) Depth of etching: 25 μm

COMPARATIVE EXAMPLE

The other part of the separated coil was irradiated with a YAG laser in the same manner as mentioned in example 6 according to the present invention. This coil strip was then immersed in 60% nitric acid at 40° C. for 60 sec to give a desired etching depth of 25 μm. The subsequent processes were the same as in example 6.

Figure 7:
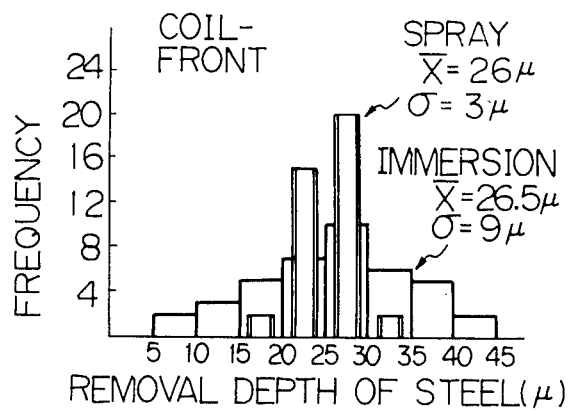
FIG. 7 are graphs showing the variation in removal depth of the steel in the three parts separated as seen along the longitudinal direction of a coil.
Figure 7:
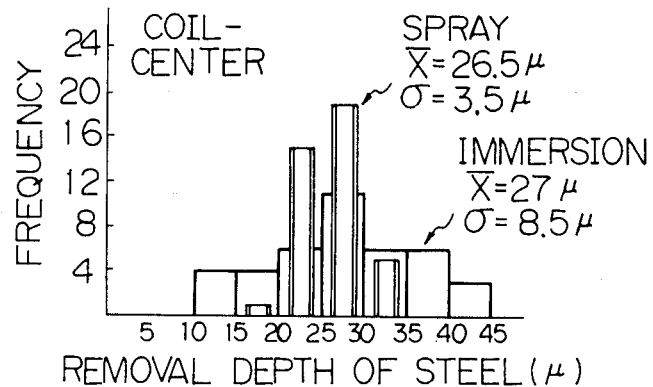
Figure 7:
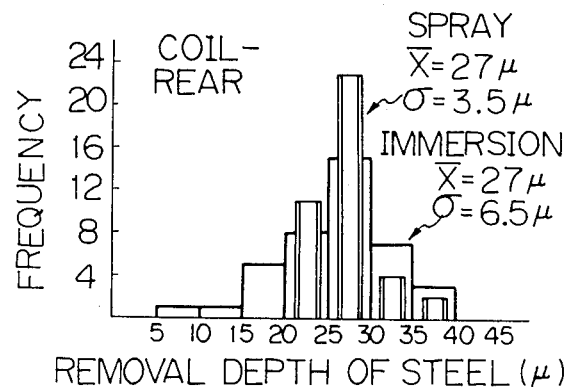
Figure 8:
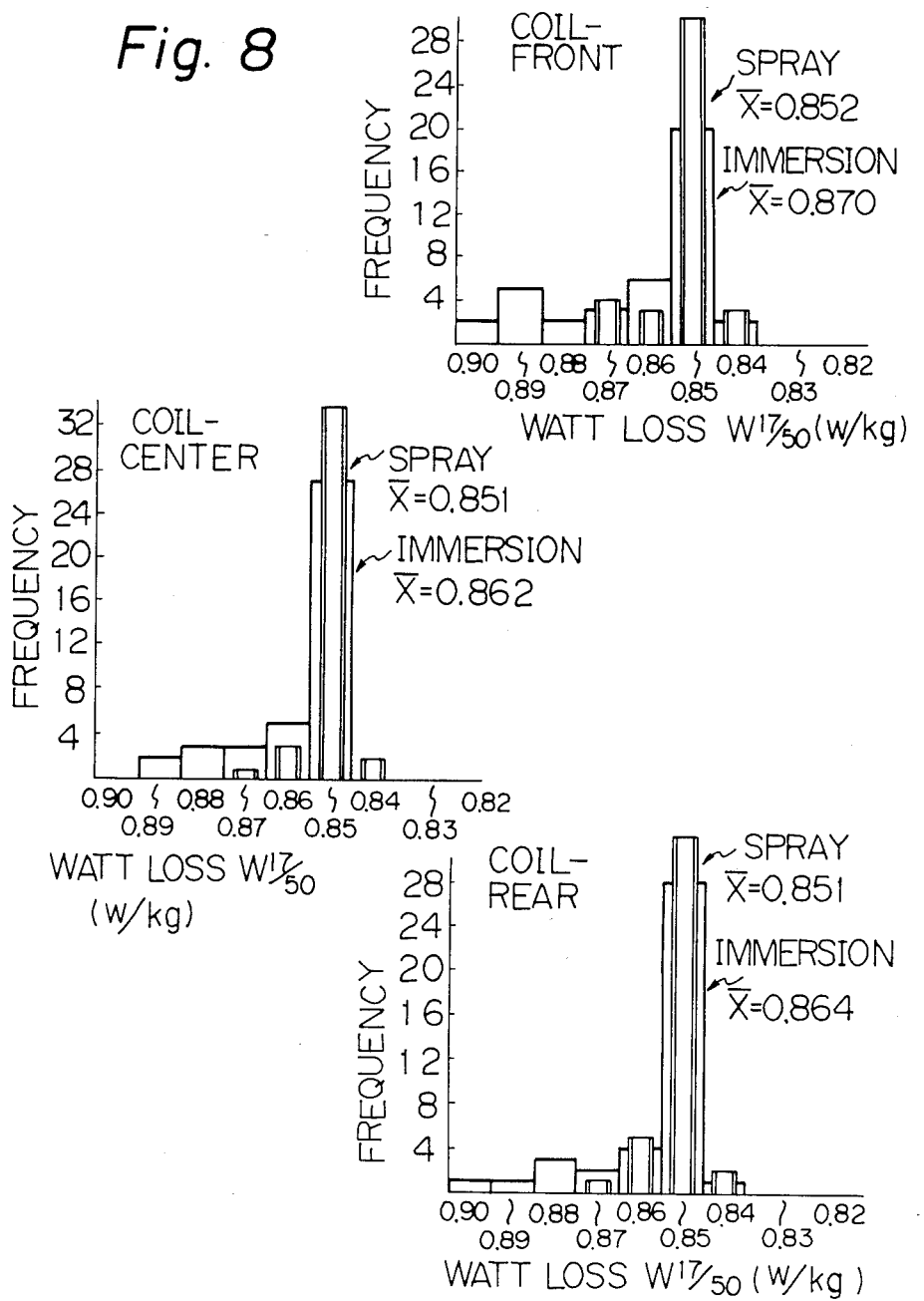
FIG. 8 shows graphs of the variation in watt loss $W_{17/50}$ at the parts of a coil corresponding to those of FIG. 6.

The etching by immersion took 60 sec, in contrast with the etching by spraying according to the present invention, which took 30 sec. Thus, there is a great advantage in etching by spraying compared to that by immersion. The graphs in FIG. 7 show the scattered values of the etched depth of underlying-metal in the longitudinal direction for Example 6 according to the present invention and for the Comparative Example. The graphs in FIG. 8 show the scattered values of the watt loss of the stress relief annealed strips corresponding to FIG. 7.

The watt loss values were determined by a single sheet magnetic measuring instrument.

The above results evidently confirm that the present invention can provide a product having an exceedingly small scatter in magnetic properties.

The process, according to the present invention, for producing low watt loss, grain oriented electrical steel sheet free from deterioration in the watt loss characteristics in the stress relief annealed state can markedly improve the pickling characteristics and watt loss scatter of the steel sheet and can greatly contribute to producing grain oriented electrical steel sheet, mainly for wound core transformer use.

It is one of the objects of the present invention to provide products having a small variation in the watt loss values, which products are obtained on an industrial production scale.

As is well known, the iron components of the pickling article are dissolved in the pickling solution, with the result that, during the pickling procedure, the Fe concentration increases in the pickling solution and the pickling ability thereof gradually lessens. The heretofore proposed measures against this usually employed are a method of decreasing the conveying speed of a strip and hence increasing the etching time when the pickling ability decreases, and a method for replenishing with fresh liquid when the pickling ability decreases. If the former method is applied for the treatment of grain-oriented electrical steel sheet in accordance with the present invention, the conveying speed of the strip is lessened not only in a pickling station but also in a laser-irradiation station. As a result, the irradiation distances and other irradiation conditions of the laser beam will vary. This in turn leads to variation in the baking condition of the film. Accordingly the former method is disadvantageous for one of the above objects, since the various properties of the product become unstable. It is possible to conceive that, depending upon the variation in the conveying speed of a strip, the conditions of laser-beam irradiation and baking conditions of film are also varied. However, this is extremely difficult in practice. Accordingly, the above object of the present invention is therefore accomplished by providing an efficient etching method, wherein the conveying speed of a grain-oriented electrical steel sheet can be always kept constant, i.e., is not decreased even if there is a gradual decrease of the etching ability. Such etching method allows the conditions for laser-beam irradiation and baking to be kept constant. More specifically, this object is attained by arranging a number of spraying nozzles of acid liquid subsequent to the laser-irradiation step, circulating the once-sprayed, etching liquid to the spraying nozzles, subjecting a grain-oriented electrical steel strip to the continuous laser-beam irradiation and etching under a constant strip conveying speed, and selecting the number of spraying nozzles used for etching in accordance with the decrease in the etching ability during the circulated use of the acid liquid.

The etching method is described in detail with reference to FIG. 4. The grain-oriented electrical steel strip S is conveyed always at a constant speed. The spray nozzles 18 consist of, for example, eight groups. The etching ability is detected by analyzing the Fe concentration in the nitric acid solution. Alternatively, it is detected by measuring the dissolution depth of samples which are taken from the product. The dissolution depth becomes shallow upon a reduction in the etching ability. When the Fe concentration becomes higher than the predetermined value or the dissolution depth becomes less than the requisite value, the valves 19 are operated to increase the number of spraying nozzles 18 used for etching. Such an increase in the nozzle number is carried out so that additional nozzles as seen in the conveying direction of strip can spray the etching solution. Accordingly the dissolution depth can be maintained constant notwithstanding the decrease in the etching ability. This in turn allows the maintaining of a constant laser-beam irradiation condition for forming the marks, and the maintaining of a constant condition for dissolving the steel of steel sheet body. It is, accordingly, easy to produce an industrially grain-oriented electrical steel sheet having magnetic properties stable at a high level.

The spraying method is also advantageous in the case of an emergency stop of pickling line. In the case of an emergency, the spraying is interrupted to immediately stop the feeding of nitric acid solution to the steel strip S. The subsequent water rinsing effectively prevents piercing or rupturing of the steel strip S due to an excess of acid.

EXAMPLE 7

0.23 mm thick high magnetic flux density, grain-oriented electrical steel strips coated with tension insulation film (5 g/m$^2$) were processed through the line shown in FIG. 4 to form underlying-metal exposed sites, i.e., coating film removed sites, on the surfaces of the strips by means of irradiation by a YAG laser. The strips then underwent etching of the underlying-metal exposed sites in a etching apparatus having multiple rows of nitric acid sprays. The strips were subsequently washed by water, dried and finally subjected to a tension insulation coating treatment (2 g/m$^2$) in order to repair the underlying-metal exposed sites.

The laser irradiation and etching conditions were as follows:
(1) Line speed: 40 m/min (constant)
(2) Laser irradiation:
  (a) Irradiated surface: one surface
  (b) Energy density: 2 mJ/mm$^2$
  (c) Irradiation marks:
    Diameter of spots: 0.2~0.3 mm
    Distance between the centers of spots in C direction (direction along width): 0.5 mm
    Distance between the rows of spots in L direction (longitudinal direction): 5 mm
(3) Etching:
  (a) Mode: spraying
  (b) Medium: 60 wt % nitric acid held at 40° C.
  (c) Number of rows of sprays: 20
  (d) Duration of spraying: 30 sec or more
  (e) Depth of etching: 25 μm 250 tons of steel strips were treated under the above mentioned conditions, though the number of rows of working sprays were increased from an initial number of 4 to a final number of 20 according to a dropping concentration of the nitric acid and a rising concentration of Fe during etching, as shown in FIG. 9. The thus treated strips were stress relief annealed at 800° C. for 2 hrs in an N$_2$.atmosphere and then subjected to watt loss measurement. The determined watt loss values are also shown in FIG. 9. The watt loss values were determined by a single sheet magnetic measuring instrument.

As is seen in FIG. 9, even depths of etching and resultant even, low watt loss values were obtained.

COMPARATIVE EXAMPLE

The starting steel strips were equivalent to those used in Example 7.

Laser irradiation on the strips was carried out at the same line speed as in Example 7. After the irradiation, the strips were then immersed in 60 wt % nitric acid at 40° C. for a constant time of 60 sec. The subsequent processes were the same as in Example 7.

Though the concentrations of nitric acid and Fe showed similar tendencies during etching to those in Example 7, the etched depth decreased with an increase in the steel weight etched. Particularly, for a weight exceeding 100 tons, the tendency became stronger, and accordingly, the watt loss values of the stress relief annealed steel strips were raised.

The process, according to the present invention, for producing low watt loss, grain-oriented electrical steel sheet free from deterioration in the watt loss characteristics in a stress relief annealed state, in which process a laser irradiation treatment and an etching treatment are carried out continuously and at a constant line speed realized by a special etching method, can provide a product with a low and stable watt loss value.

We claim:

1. A method for producing a grain oriented electrical steel sheet, wherein a final texture annealed grain-oriented electrical steel sheet or a final texture annealed and then insulation-film coated grain-oriented electrical steel sheet is subjected to a selective removal of the surface of at least one side of the steel sheet body to a depth of from 0.01 to 0.10 mm, and subsequently, a film, which imparts a tension to said steel sheet body, is applied thereon, and then is stress relief annealed at a temperature of a least 800° C.

2. A method according to claim 1, wherein a phosphate coating solution is applied on said steel sheet body to form said tensioning film.

3. A method according to claim 1 wherein said selective removal comprises selectively removing said insulating film formed on the steel sheet body to expose selectively the steel sheet body and then etching the selectively exposed steel sheet body, by an acid solution.

4. A method according to claim 3 wherein said selective removal is carried out by one of the means selected from the group consisting of laser beam, electron beam and infrared ray.

5. A method according to claim 3, wherein the removal of film is carried out by laser irradiation.

6. A method according to claim 3, wherein the nitric acid solution is used for the ethcing.

7. A method according to claim 6, wherein the nitric acid concentration is from 20 to 70% by weight.

8. A method according to claim 7, wherein the nitric acid concentration is from 30 to 60% by weight.

9. A method according to claim 6, wherein the nitric acid solution is sprayed on the grain-oriented electrical steel sheet.

10. A method for reproducing a grain-oriented electrical steel sheet from a final texture annealed and insulation-film coated grain-oriented electrical steel sheet body, comprising:

selectively removing the insulation film from at least one side of the steel sheet body to selectively expose the steel sheet body by thermal means selected from the group consisting of laser irradiation, electron beam irradiation, and infrared irradiation;

etching the selectively exposed steel sheet body by a nitric acid solution to a depth of from 0.01 to 0.10 mm; and applying a coating solution to the steel sheet body to form a film which imparts a tension to the steel sheet body.

11. A method according to claim 10 wherein said thermal means is laser irradiation.

* * * * *

UNITED STATES PATENT AND TRADEMARK OFFICE
CERTIFICATE OF CORRECTION

PATENT NO. : 4,750,949
DATED : June 14, 1988
INVENTOR(S) : H. Kobayashi, et al

It is certified that error appears in the above-identified patent and that said Letters Patent is hereby corrected as shown below:

Column 1, line 10, insert --is-- between "invention" and "related".

Column 1, line 12, change "deteriorate" to --deteriorated--.

Column 1, line 27, change "annealig" to --annealing--.

Column 1, line 33, change "recyrstallization" to --recrystallization--.

Column 2, line 24, change "FIG. 3A through G" to --FIGS. 3A through G--.

Column 3, line 14, omit "the" at the end of the line.

Column 3, line 2, change "one stage-or two stage-cold" to --one-stage or two-stage cold--.

Column 3, line 64, change "application the" to --application of the--.

Column 3, line 65, omit "it" between "coating" and "was".

UNITED STATES PATENT AND TRADEMARK OFFICE
CERTIFICATE OF CORRECTION

PATENT NO. : 4,750,949
DATED : June 14, 1988
INVENTOR(S) : H. Kobayashi, et al

It is certified that error appears in the above-identified patent and that said Letters Patent is hereby corrected as shown below:

Column 5, line 6, add --acid-- after "nitric".

Column 6, line 68, change "grain-off" to --grain--.

Column 8, line 35, change "Each" to --The--.

Column 9, line 25, omit "in" between "decreasing" and "watt".

Column 9, line 61, change "the" to --then--.

Column 10, line 53, insert "on" between "formed" and "one".

Column 13, line 60, change "a etching" to --an etching--.

Column 14, line 62, change "a least" to --at least--.

UNITED STATES PATENT AND TRADEMARK OFFICE
CERTIFICATE OF CORRECTION

PATENT NO. : 4,750,949
DATED : June 14, 1988
INVENTOR(S) : H. Kobayashi, et al.

It is certified that error appears in the above-identified patent and that said Letters Patent is hereby corrected as shown below:

Column 16, line 1, change "reproducing" to --producing--.

Signed and Sealed this

Seventeenth Day of January, 1989

*Attest:*

DONALD J. QUIGG

*Attesting Officer*   *Commissioner of Patents and Trademarks*